United States Patent [19]

Bunkenburg

[11] 4,436,424
[45] Mar. 13, 1984

[54] INTERFEROMETER USING TRANSVERSE DEVIATION OF TEST BEAM

[75] Inventor: Joachim Bunkenburg, Rochester, N.Y.

[73] Assignee: GCA Corporation, Bedford, Mass.

[21] Appl. No.: 287,269

[22] Filed: Jul. 27, 1981

[51] Int. Cl.³ .............................................. G01B 9/02
[52] U.S. Cl. ..................................... 356/356; 356/358
[58] Field of Search .............. 356/354, 355, 356, 357, 356/358, 363; 350/162.23; 372/102

[56] References Cited

U.S. PATENT DOCUMENTS

| 3,090,279 | 5/1963 | Chisholm | 356/354 |
| 3,572,937 | 3/1971 | Baldwin | 356/354 |
| 4,103,254 | 7/1978 | Chikami | 372/102 X |
| 4,330,211 | 5/1982 | Peterson et al. | 356/354 |

Primary Examiner—William L. Sikes
Assistant Examiner—Matthew W. Koren
Attorney, Agent, or Firm—Stonebraker, Shepard & Stephens

[57] ABSTRACT

A laser interferometer 10 uses light divided into reference beam 14 and test beam 15 traveling different paths from which beams 14 and 15 are reflected and recombined for detecting interference fringes. The path for test beam 15 is arranged to change in length with deviation transverse to its path. To do this, a reflective diffraction grating 25 is inclined relative to test beam 15 at the autocollimation angle of the grating to reflect the test beam back on itself from the inclined surface of the grating. Then transverse deviation of the region where test beam 15 is incident on grating 25 changes the path length of the test beam reflected from the inclined surface of the grating and allows a measurement.

13 Claims, 3 Drawing Figures

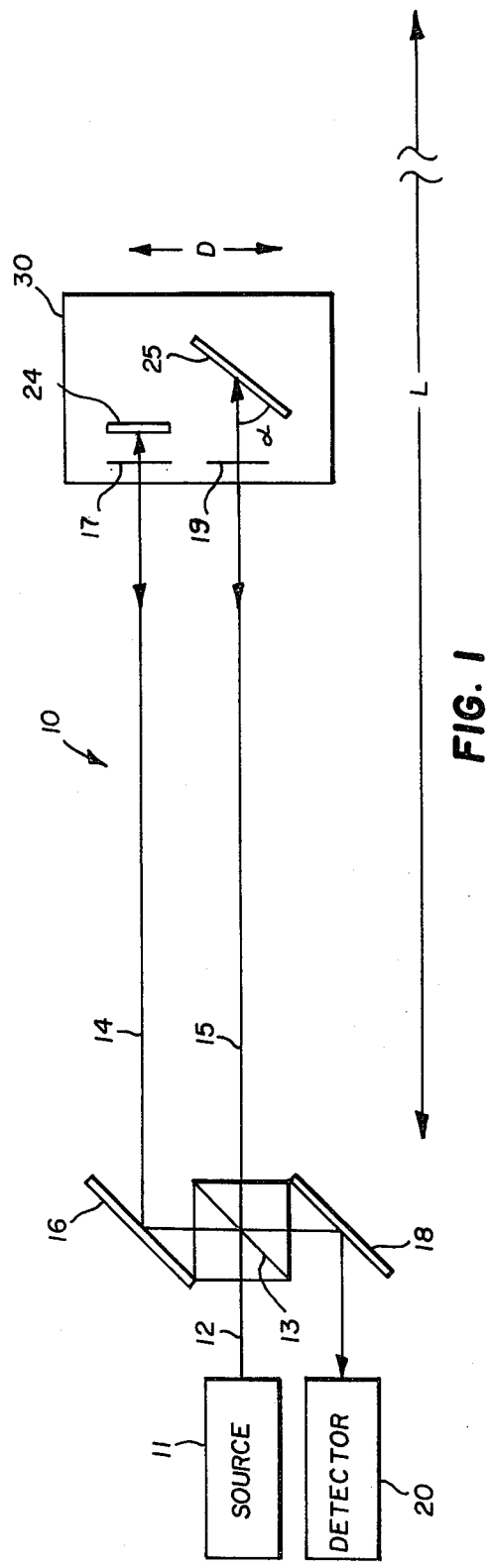
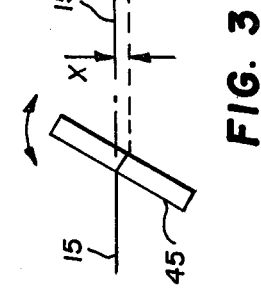
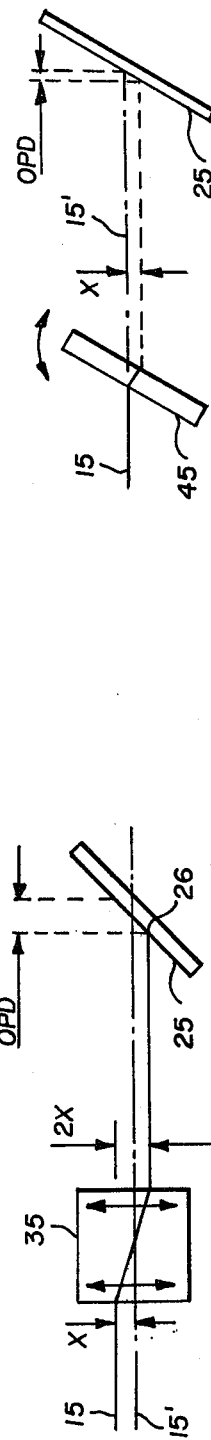
FIG. 1
FIG. 2
FIG. 3

INTERFEROMETER USING TRANSVERSE DEVIATION OF TEST BEAM

BACKGROUND

Straightness has been measured by arranging an optical system so that deviation of the test beam transversely of its path as an element moves along a line also changes the path length of the test beam relative to the reference beam to produce interference fringes that allow measurement of the transverse deviation. The prior art has accomplished this with a movable birefringent element such as a Wallaston prism that travels along the line and splits a beam into two beams at an acute angle to each other, forming a Y-shape. Both of the angled beams are reflected back on themselves from accurately perpendicular mirrors; and if the prism deviates transversely from the beam path, it changes the path lengths of the two beams to produce interference fringes and a measurement of the transverse deviation. Such an arrangement can measure the straightness of the bed of a lathe, machine tool, or other line along which the prism can move.

The prior art system suffers many disadvantages. It requires large, expensive mirrors with accurately flat surfaces set accurately perpendicular with the beams. The working length of prism travel is limited by the mirrors so that the instrument has to be made in several sizes for measuring different lengths. Most serious of all, however, is that the small acute angle between the beams diverged by the birefringent prism optically reduces the error signal by a factor of 36 in translating transverse deviation into an optical path difference. This requires expensive detector electronics to amplify and process the optically reduced error signal so that the electronics can make up for the loss and produce a sufficiently accurate signal. All these disadvantages cooperate to make prior art straightness measuring instruments expensive, temperamental, costly to maintain, and limited in scope and accuracy.

I have devised a better way of producing an optical path difference between a reference and test beam in response to transverse deviation relative to the test beam. My instrument not only eliminates optical reduction of the transverse error, but can optically magnify this error to increase the accuracy and reduce the burden on the detector electronics. My instrument can also measure over both short and long range distances without modification; and besides being usable for straightness measurement, it can measure angular deviation and small deviations transverse to the test beam by any one of several alternatives. These features make it less expensive, more accurate and reliable, easier to operate and maintain, more versatile, and usable over wider distance ranges.

SUMMARY

My invention applies to a laser interferometer that uses light divided into reference and test beams traveling different paths from which the beams are reflected and recombined for detecting interference fringes. The path for the test beam is arranged to change in length with deviation transverse to its path. To do this, I use a reflective diffraction grating inclined at its autocollimation angle relative to the incident test beam to reflect the test beam back on itself and cause transverse deviation of the region where the test beam is incident on the inclined grating to change the path length of the test beam. I prefer gratings having autocollimation angles of about 45° or more, and I also prefer mounting the reference beam reflector in the region of the grating so that the paths of the reference and test beams are approximately parallel and equal in length.

DRAWINGS

FIG. 1 is a schematic diagram of a preferred embodiment of my inventive interferometer; and FIGS. 2 and 3 are schematic diagrams of preferred alternatives for producing transverse test beam deviation in the interferometer of FIG. 1.

DETAILED DESCRIPTION

Interferometer 10 uses several components that are known in the optical interferometry art and differs from previous interferometers primarily in the way the test beam is reflected as described below. A light source 11 that is typically a laser and preferably a helium neon laser produces a single wave length beam 12 that is divided by a polarizing beam splitter 13 into a test beam 15 and a reference beam 14. Mirror 16 directs reference beam 14 along a path that is preferably parallel with reference beam 15, and both beams are reflected back on themselves by end-of-path reflectors as described below. Beams 14 and 15 differ in polarization orientation which is altered by passing twice through quarter wave plates 17 and 19 in proceeding to and from the end-of-path reflectors so that means 14 and 15 recombine at polarization beam splitter 13 and are directed by mirror 18 to an interference detector 20.

There are many different ways that reference and test beams can be formed and routed in my interferometer, but I prefer that the path for reference beam 14 be approximately parallel with and equal in length to the path for test beam 15 so that the beams are close together and experience similar atmospheric conditions as they travel between source 11 and detector 20 for keeping system noise to a minimum.

Detector 20 can have many forms, and I prefer a detector such as described in U.S. patent application Ser. No. 112,738, filed Jan. 17, 1980, now abandoned entitled DETECTOR SYSTEM FOR LASER INTERFEROMETER, the disclosure of which is hereby incorporated by reference into this application.

To make interferometer 10 responsive to transverse deviation relative to test beam 15, I use a reflective diffraction grating 25 as the end-of-path reflector for test beam 15, and I incline diffraction grating 25 relative to test beam 15 at the autocollimation angle of the grating so that grating 25 reflects test beam 15 back on itself. Then, any transverse deviation in the region where test beam 15 is incident on inclined diffraction grating 25 changes the path length of test beam 15 and produces an optical path difference causing interference fringes enabling a measurement.

As shown in the illustrated interferometer 10, setting diffraction grating 25 at its autocollimation angle alpha to test beam 15 makes grating 25 reflect test beam 15 back on itself from an inclined surface. Reflective diffraction gratings are available with rulings spaced so that autocollimation angle alpha can be about 45° or more to test beam 15. At a 45° inclination, any transverse deviation in the region where test beam 15 is incident on grating 25 changes the path length of test beam 15 along the sloping surface of grating 25 to produce an equal optical path difference enabling the interferometer to measure the transverse deviation. At autocollimation angles of inclination larger than 45°, grating 25 enlarges or magnifies the optical path difference for a transverse deviation. Grating angles of less than 45° are also possible, but they have the disadvantage of reducing the optical path difference for a transverse deviation.

Experiments have shown that rulings on the reflective surface of grating 25 do not produce discontinuities in the reflected light so that grating 25 effectively presents a continuous, inclined reflective surface that varies the optical path length as the incidence region moves transversely of the grating surface.

Transverse deviation to be measured can occur by moving grating 25 transversely of test beam 15 or moving beam 15 transversely of grating 25, and the drawings illustrate several preferred arrangements for using these possibilities.

In the embodiment illustrated in FIG. 1, reference beam reflector 24 is mounted alongside diffraction grating 25 on carriage 30, which can deviate transversely of test beam 15 for measurement purposes. Carriage 30 can move parallel with test beam 15 along the length of a line to be measured for straightness as indicated by the L arrows, and any transverse deviation of the line followed by carriage 30 will deviate grating 25 transversely of beam 15 as shown by the D arrows to produce a measurement. Carriage 30 can also be arranged to move only in the direction of the transverse D arrows to produce a direct measurement of the transverse deviation.

Carriage 30 can move large distances along a line to be measured for transverse deviation, especially with reference reflector 24 mounted on carriage 30 alongside grating 25 as illustrated so that the path of reference beam 14 approximates the path of test beam 15. Straightness measurement lengths of up to 200 feet are practical with this instrument, and both short and long lines can be measured for deviation from straightness without any modification of interferometer 10.

Another way of using instrument 10 by producing transverse deviation of test beam 15 is schematically diagrammed in FIG. 2. Test beam 15 is directed through a telescope 35 arranged to move parallel with beam 15 between beam splitter 13 and diffraction grating 25. Telescope 35 can then follow a line to be measured for deviation from straightness in a direction transverse to beam 15 as indicated by the arrows on telescope 35.

If during such movement the optical axis 15' of telescope 35 deviates from beam 15, it receives beam 15 in an off-axis point of incidence and changes the region 26 where beam 15 is incident on grating 25 to produce an optical path difference as indicated by arrows. With telescope 35 having a magnification factor of 1, a transverse deviation of x, as indicated by arrows, deviates beam 15 by 2×, as also indicated by arrows, to double the optical error and enhance the instrument's accuracy. By increasing the magnification power of telescope 35, the optical error from transverse deviation can be further magnified.

Interferometer 10 can also be used for measuring angular deviation by an arrangement such as shown in FIG. 3. An angularly movable refractor such as a prism or plate 45 arranged in the path of test beam 15 can transversely deviate beam 15 from its direct path 15' by the distance x as shown by arrows when plate 45 moves angularly. This produces an optical path difference as indicated by arrows and allows the angular deviation to be measured.

There are other optical elements that can be arranged in the path of test beam 15 to produce transverse deviation enabling measurement of a movement. There are also many ways that such a component can be mechanically moved to correspond with a deviation to be measured. Moreover, the instrument can be used with different light sources and detectors, and different devices for separating and recombining the test and reference beams. Ability to magnify rather than reduce the optical error and to use transverse deviation to accomplish interferometry in a simple and reliable way makes it practical, economical, and versatile.

I claim:

1. An interferometer using light divided into reference and test beams traveling different paths from which said beams are reflected and recombined for detecting interference fringes, the path for said test beam being arranged to change in length with deviation transverse to said test beam path, said interferometer comprising:
   a. a test beam reflector formed as a reflective diffration grating;
   b. said diffraction grating being inclined relative to said test beam at the autocollimation angle of said grating so said grating reflects said test beam back on itself;
   c. means responsive to said deviation transverse to said test beam path for moving the region where said test beam is incident on said inclined grating; and
   d. said inclination of said diffraction grating being oriented relative to said test beam so that movement of said region where said test beam is incident on said inclined grating changes the path length of said test beam.

2. The interferometer of claim 1 wherein said autocollimation angle is about 45° or more.

3. The interferometer of claim 1 including means for moving said grating transversely of said test beam in correspondence with a deviation to be measured.

4. The interferometer of claim 1 including means for moving said test beam transversely of said grating in correspondence with a deviation to be measured.

5. The interferometer of claim 1 wherein a telescope is arranged for moving along a line parallel with said test beam path while said test beam passes through said telescope to measure said line for deviation transverse to said test beam path.

6. The interferometer of claim 1 including angularly movable means in the path of said test beam for moving said test beam transversely of said grating to measure angular deviation.

7. The interferometer of claim 1 wherein a reflector for said reference beam is arranged in the region of said grating so that said reference and test beams are approximately parallel and of approximately equal lengths.

8. The interferometer of claim 7 wherein said reference beam reflector and said grating are mounted for movement together along a line parallel with said test beam path to measure said line for deviation transverse to said test beam path.

9. The interferometer of claim 7 wherein said autocollimation angle is about 45° or more.

10. The interferometer of claim 7 including means for moving said grating transversely of said test beam in correspondence with a deviation to be measured, 11. The interferometer of claim 7 including means for moving said test beam transversely of said grating in correspondence with a deviation to be measured.

12. The interferometer of claim 11 wherein said movable means is a telescope arranged for moving along a line parallel with said test beam path while said test beam passes through said telescope to measure said line for deviation transverse to said test beam path.

13. The interferometer of claim 11 wherein said movable means is an angularly movable element in the path of said test beam for moving said test beam transversely of said grating to measure angular deviation.

* * * * *